United States Patent [19]

Guimard et al.

[11] 4,455,875

[45] Jun. 26, 1984

[54] PRESSURE MEASUREMENT SONDE

[75] Inventors: André Guimard; Jacques Lemarchand, both of Vaux-le-Pénil, France

[73] Assignee: Schlumberger Technology Corporation, New York, N.Y.

[21] Appl. No.: 333,494

[22] Filed: Dec. 22, 1981

[30] Foreign Application Priority Data

Dec. 24, 1980 [FR] France ................ 80 27734

[51] Int. Cl.³ ............... G01L 19/04; E21B 47/06
[52] U.S. Cl. ........................... 73/708; 73/151
[58] Field of Search ............... 73/708, 151, 152, 154, 73/753, 754

[56] References Cited

U.S. PATENT DOCUMENTS

| 2,676,489 | 4/1954 | Basham | 73/342 |
| 3,286,526 | 11/1966 | Mulcahy et al. | 73/708 |
| 3,303,695 | 2/1967 | Laimins et al. | 73/141 |
| 3,304,776 | 2/1967 | Bennett et al. | 73/151 |
| 3,527,099 | 9/1970 | Herceg | 73/708 |
| 4,096,752 | 6/1978 | Tonnelli | 73/151 |

FOREIGN PATENT DOCUMENTS

| 2531784 | 4/1976 | Fed. Rep. of Germany . |
| 2526754 | 12/1976 | Fed. Rep. of Germany . |
| 2700902 | 7/1978 | Fed. Rep. of Germany . |
| 2308925 | 11/1976 | France . |
| 2445951 | 8/1980 | France . |

OTHER PUBLICATIONS

The Oil and Gas Journal, vol. 66, No. 2, Jan. 8, 1968, F. H. Deily et al., "New Drilling-Research Tool Shows What Happens Down Hole".

"A New, Surface Recording, Down-Hole Pressure Gauge," by G. B. Miller, Society of Petroleum Engineers, Paper Number SPE 4125.

Primary Examiner—Donald O. Woodiel

[57] ABSTRACT

A pressure measurement sonde of the type comprising two piezoelectric detectors, one being used for pressure measurements and the other being used as a reference detector. The latter is used to compensate at least partly, the effects due to temperature variations. This sonde includes means for favoring the heat exchanges of said detectors with the surrounding medium and for substantially balancing the heat exchange rates of each of said detectors with the surrounding medium. The sonde is particulary adapted to the carrying out of pressure measurements in oil wells.

10 Claims, 2 Drawing Figures

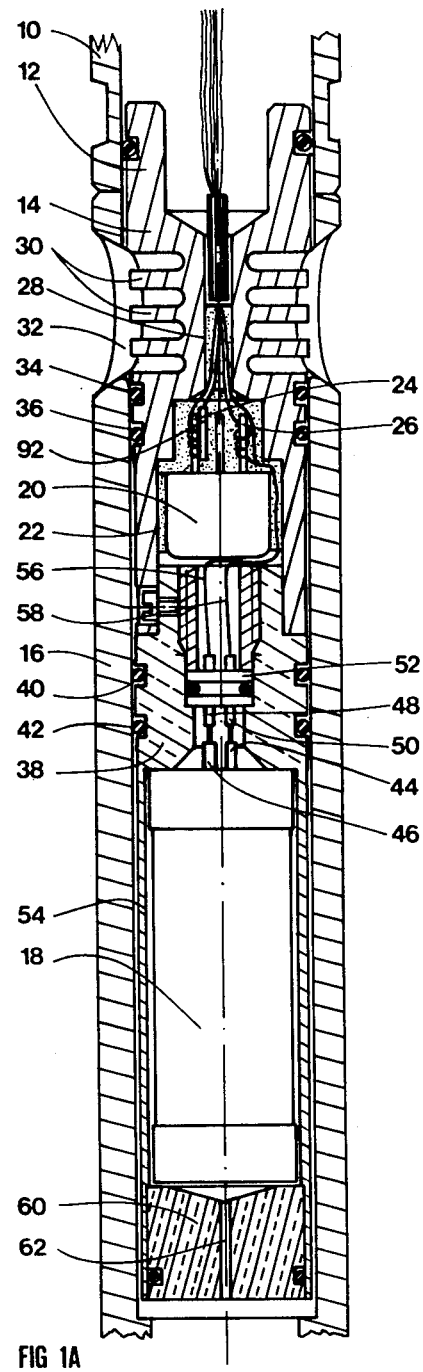
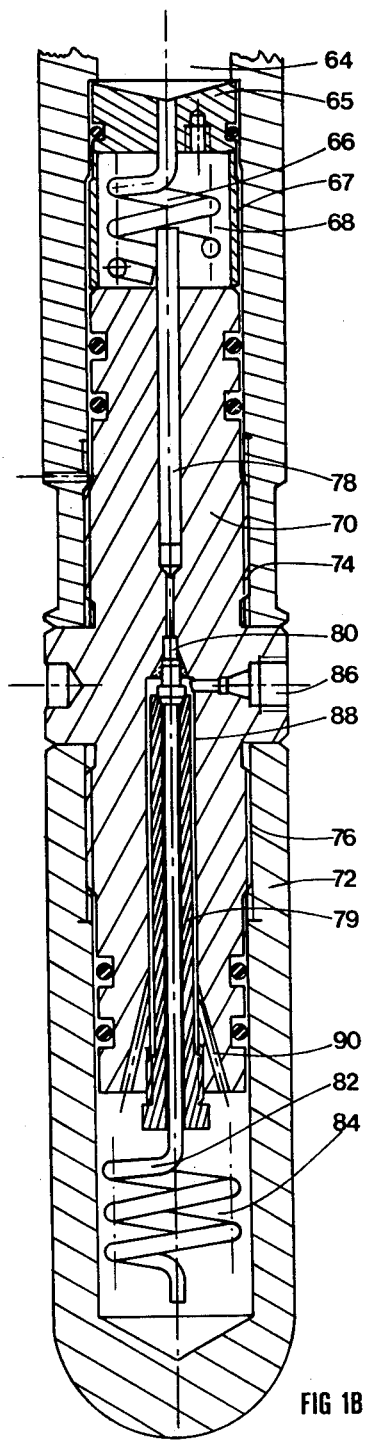
FIG 1A
FIG 1B

PRESSURE MEASUREMENT SONDE

BACKGROUND OF THE INVENTION

1. Field of the Invention

This invention relates to a pressure measurement sonde utilizable in particular for carrying out pressure measurements in underground wells, such as oil wells. More particularly, the invention relates to improvements made in a pressure measurement sonde in order to correct the effects due to temperature as well a to temperature variations. The improvements also concern the mechanical design of the sonde.

2. Prior Art

It is current practice in the petroleum industry to carry out pressure measurements in wells producing hydrocarbons. Pressure is in fact an important physical characteristic for the production and operation of oil wells. Thus, during tests conducted before a well goes into production, a pressure sonde is lowered into the well, a valve is closed in order to stop the flow of fluid and the pressure variations as a function of the time elapsing since the closing of the valve are measured. The curve obtained, called the pressure build-up curve, contributes to the determination of the characteristics of the producing zone. Tests are also conducted on the interference between two neighboring wells, by carrying out pressure measurements in one of the wells as a function of the flow of hydrocarbons in the adjacent well.

The sondes used are lowered into the well at the end of a cable. This cable can be electrical and, in this case, the measurement signals are transmitted directly to the surface. The cable can be nonconducting and, in this case, the information is recorded downhole in a memory contained in the sonde. One of the sondes most widely used at the present time for pressure measurements is certainly the sonde manufactured by the American company Hewlett-Packard under the reference 2813 B. This sonde is described for example in the article entitled "A New, Surface Recording, Down-Hole Pressure Gauge" published by G. B. Miller et al. in the "Society of Petroleum Engineers Journal" under the number SPE 4125, or in the U.S. Pat. No. 3,561,832 (H. E. Karrer et al.).

This sonde includes, in the same enclosure, two crystal detectors, one being subjected to the pressure and temperature conditions prevailing in the well whereas the other is subjected only to temperature. By taking the difference of the indications given by these two crystal detectors, a pressure measurement independent of temperature is obtained. This system however operates prefectly well under static temperature conditions, but the temperature compensation is no longer satisfactory when a rapid variation in the temperature of the surrounding medium occurs. It is then necessary to wait as long as required for the two measurement and reference detectors to reach thermal equilibrium before a proper pressure measurement can be carried out. Furthermore, the mechanical characteristics of the sonde are not satisfactory in every respect.

A solution considered for overcoming these drawbacks consists in determining the pressure variation law measured with the sonde as a function of temperature and in correcting, on the surface, the measurements obtained as a function of said law. This law is not linear and is relatively complex. It is thus difficult to use. Another solution consists in placing the measurement system within an isothermal enclosure, for example a Dewar vessel. However, the sonde must be lowered within tubes of small diameter forming the production string for example. The small diameter of the tubes however makes it difficult to design a sonde with an isothermal enclosure.

SUMMARY OF THE INVENTION

One object of the invention is to provide a pressure measurement sonde which is not sensitive or only slightly sensitive to the temperature variations in the surrounding medium. Another object is to provide a sonde whose detectors are effectively protected against shocks and against fouling upon the raising and lowering of the sonde For this purpose, the invention provides an apparatus for pressure measurement with compensation for the effect due to the temperature of the surrounding medium, of the type comprising a pressure measurement detector sensitive to pressure and temperature, a reference detector insulated from the surrounding medium whose pressure is to be measured and sensitive to temperature, and a box containing said detectors and having means for establishing communication between the pressure of the surrounding medium and said measurement detector, said pressure measurement apparatus comprising means for favoring the heat exchanges of said detectors with the surrounding medium and for substantially equalizing the heat exchange rates of each of said detectors with the surrounding medium.

BRIEF DESCRIPTION OF THE DRAWINGS

The invention will be better understood from the following description accompanied by drawings in which FIGS. 1A and 1B represent, in section, the part containing the detectors of a sonde according to the invention.

THE PREFERRED EMBODIMENT

In these FIGS., the electric cable on which the sonde is suspended, as well as the electronic part of the sonde, has not been represented. The electronic part includes mainly two oscillators, one of which is associated with the measurement detector and the other with the reference detector, and a mixing circuit receiving the signals coming from the oscillators and delivering an output signal whose frequency is equal to the difference in the frequencies of the signals delivered by the oscillators. This frequency varies in proportion to the pressure. As an example, a variation of about 1.5 Hz corresponds to a pressure variation of 0.068 bar (1 psi). The frequency of the signals from the oscillators is about 5 MHz, but their difference varies between 8 and 23 kHz. The result is that the difference signal is easily transmitted without significant distortion or attenuation by the electric cable up to the surface. The electronic circuit is described, for example, in the U.S. Pat. No. 3,561,832 mentioned above. The electronic part of the sonde is placed in an electronic cartridge whose end 10 is fixed in a sealed manner on the upper part 12 of a heatsink 14 abutting on the upper end of the casing 16 of the part of the sonde containing the transducers.

This casing, made of stainless steel, includes a piezoelectric pressure measurement detector 18 and a piezoelectric reference detector 20. These detectors are manufactured and sold by the American company Hewlett- Packard under the reference 5080-8725 for the measurement detector and under the reference 5080-8724 for the reference detector. The measurement detector 18 is described in detail in U.S. Pat. No. 3,561,832 already mentioned.

The reference detector 20 is placed in a recess 22 inside the heatsink 14. The free space of the recess is filled with a silicone resin including beryllium oxide. This resin is manufactured and sold by the American company National Beryllia Corporation under the name of "Flexible Encapsulant-Type BS 0205". The two outputs of the reference detector are connected to the electronic part by two electric wires going through a central channel 28 made in the heatsink 14. The latter is made of stainless steel and has fins 30 located opposite openings 32 provided in the casing 16. Two O-rings 34 and 36 placed between the casing 16 and the heatsink 14 provide tightness between these two parts.

The pressure measurement detector 18 is placed in a sleeve 38 made of a good heat conducting material such as beryllium bronze. Seals 40 and 42 are placed between the casing 16 and the sleeve 38. The two outputs 44 and 46 of the measurement detector are connected electrically to the two electrical passages 48 and 50 of a glass-metal partition 52 providing tightness between the recess 22 containing the reference detector and the enclosure 54 in which the measurement detector is located. Two electrical wires 56 and 58 connect the sealed passages 48 and 50 to the electronic part of the sonde by going through the recess 22 in which is located the reference detector. The measurement detector 18 is kept under mechanical stress in the enclosure 54 by means of a holding piece 60. This piece is penetrated by a longitudinal channel 62 making it possible to place the enclosure 54 in communication with a chamber 64 which communicates with the outlet of a first spiral-wound tube 66. This tube is contained in a first chamber 68. The end of the tube in communication with the chamber 64 is fixed to the center of a piece 65 mounted in a sealed manner in the casing 16 and held in place by means of a hollow cylinder 67. The other end of the tube 66 is left open inside the chamber 68. An intermediate piece 70 connects the lower end of the casing in a sealed manner to a hollow cylindrical piece 72 by means of threading 74 and 76. The intermediate piece 70 includes a central bore in which is fixed a rectilinear tube 78, one end of which leads into the first chamber 68. Its other end is connected by means of a sealed coupling 80 to one of the two ends of a second hollow tube 82 having a rectilinear part and a part in the form of a cylindrical spiral. The rectilinear part is fixed in the bore of the intermediate piece 70 by means of an attachment piece 79. The part of the tube 82 in spiral form is contained in a chamber 84 and its free end is open in this chamber. The intermediate piece 70 includes an opening 86 communicating with the space 88 between the central bore of the intermediate piece and the rectilinear part of the tube 82. This space 88 leads into the chamber 84 by means of channels 90.

The sonde is placed in the medium whose pressure or pressure variations are to be measured. This medium consists of a fluid which can be a liquid or a gas. The pressure of this fluid is thus communicated to the measurement detector via the orifice 86.

When the sonde is brought up, the empty spaces between the orifice 86 and the sealed partition 52 are filled with silicone oil. The enclosure 54, the channel 62, the chambers 64, 68 and 84, the tubes 66, 78 and 82, the channels 90, the space 88 and the orifice 86 are thus filled with silicone oil. The pressure of the medium in which the sonde is placed is thus transmitted by the tubes, the chambers and the channel 62 to the measuring detector 18. It will be noted that the fluid of the medium surrounding the sonde does not come into contact with the measurement detector 18 but that the pressure of this fluid is transmitted to the measurement detector through the tubes. The measurement transducer 18 is thus protected from pollution by the surrounding medium.

It will be noted that the measurement detector is placed in a metal sleeve 38 so that upon the lowering and raising of the sonde, the detector is protected from shocks and from possible fouling.

The reference detector 20 is made up principally of an enclosure containing a piezoelectric crystal under vacuum. It will be noted that, thanks to the sealed partition 52 and to the different seals 34, 36, 40 and 42, the reference detector 20 is not subjected to the pressure of the medium in which the sonde is placed. On the other hand, this detector is subjected to the temperature of this medium. As regards the measurement detector 18, it is subjected to both the pressure and temperature of the fluid of the surrounding medium. By subtracting the response of the reference detector from the response of the measurement detector, a signal representative of the pressure only is obtained. As already mentioned, the frequency of this difference signal varies in proportion to the pressure variations. However, the heat exchanges between each of the two detectors and the surrounding medium are very different. In fact, the sensitive element of the measurement detector 18 is not thermally insulated from the surrounding medium whereas the piezoelectric crystal of the transducer 20 is placed under vacuum and is hence relatively insulated from the temperature variations. Consequently, when a variation occurs in the temperature of the surrounding medium, this variation is picked up rapidly by the measurement detector and much less rapidly by the reference detector. The result is that, when a heat balance is not reached, the measurements carried out by the sonde during this intermediate period are distorted. To overcome this drawback, the heatsink 14 has been used and the reference detector 20 has been placed inside the recess 22 provided in the heatsink. Moreover, the free space of this recess has been filled with a compound having a base of beryllium oxide, an excellent heat conductor. The fins 30 of the heatsink, as well as the material chosen for making this heatsink, namely stainless steel, contribute to transmitting the temperature variations as rapidly and as effectively as possible to the reference transducer 20. In this way, the heat exchanges between each of the two detectors and the surrounding medium are substantially balanced. Consequently, the pressure measurements recorded with the sonde practically do not contain errors, even if a temperature variation occurs, or perhaps only during a very short time interval.

In addition, the sonde comprises, in accordance with one of the characteristics of the invention, a thermometer 92 placed in the recess 22. This thermometer, composed of a platinum resistor, placed in the immediate vicinity of the reference detector 20, makes it possible to determine with accuracy the value of the measurement pressure. In fact, with this type of sonde operating with heat-sensitive piezoelectric crystals, it is necessary to know the value of the temperature exactly, to within better than one degree Celsius, to obtain good accuracy on the pressure measurements. The thermometer 92 is connected to the electronic part of the sonde by two electric conductors passing through the central channel 28 of the heatsink, the temperature measurement signal being transmitted to the surface by the electric cable.

Tests conducted with a sonde according to the invention have demonstrated the very good performance of the sonde. Thus, by having the sonde undergo a sudden temperature variation of about 30° C., while keeping the external pressure constant, the error on the pressure measurement due to the sudden variation in temperature is only about 300 millibars and after about ten minutes, the temperature variation no longer has an effect on the pressure measurement.

It goes without saying that the present invention is not limited to the illustrative embodiment described here as a nonlimitative example.

We claim:

1. Apparatus, including temperature compensation, for measuring the pressure of a surrounding fluid, comprising:
    a housing having an opening and being adapted for immersion in said surrounding fluid;
    a pressure measurement detector mounted within said housing and sensitive to pressure and temperature;
    means for establishing communication between said pressure of said surrounding fluid and said pressure measurement detector;
    a reference detector mounted within said housing and sensitive to temperature;
    means for isolating said reference detector from communication with said pressure of said surrounding fluid; and
    means for favoring the heat exchanges of said detectors with said surrounding fluid and for substantially balancing the heat exchange rates of each of said detectors with said surrounding fluid, including a heatsink having a recess therein and mounted within said housing to be contacted by said surrounding fluid through said housing opening, said reference detector being contained in said recess.

2. Apparatus according to claim 1, wherein said heatsink has fins placed to be contacted by said surrounding fluid.

3. Apparatus according to claim 1, characterized in that a good heat conducting medium fills the free space of said recess containing said reference detector.

4. Apparatus according to claim 3, characterized in that said heatsink is made of stainless steel.

5. Apparatus according to claim 3, characterized in that said good heat conducting medium is a beryllium oxide based compound.

6. Apparatus according to claim 1, characterized in that said means for favoring and balancing the heat exchanges further include a sleeve placed in a sealed manner in said housing and in which said pressure measurement detector is housed.

7. Apparatus according to claim 6, characterized in that said means for favoring and balancing the heat exchanges further comprises a holding piece securing said measurement detector and penetrated by a longitudinal channel providing communication between the pressure to be measured and said measurement detector, said piece closing off one end of said sleeve.

8. Apparatus according to claim 6, characterized in that said sleeve is made of beryllium bronze.

9. Apparatus according to claim 1, further comprising temperature measurement means in the immediate vicinity of said detectors.

10. Apparatus according to claim 9, characterized in that said temperature measurement means are placed in said recess of said heatsink.

* * * * *